United States Patent
McCormack et al.

(10) Patent No.: US 12,412,338 B2
(45) Date of Patent: Sep. 9, 2025

(54) AUGMENTED THREE-DIMENSIONAL STRUCTURE GENERATION

(71) Applicant: Snap Inc., Santa Monica, CA (US)

(72) Inventors: Richard McCormack, Princes Risborough (GB); Edward James Rosten, London (GB)

(73) Assignee: Snap Inc., Santa Monica, CA (US)

( * ) Notice: Subject to any disclaimer, the term of this patent is extended or adjusted under 35 U.S.C. 154(b) by 123 days.

(21) Appl. No.: 18/072,958

(22) Filed: Dec. 1, 2022

(65) Prior Publication Data
US 2024/0185524 A1    Jun. 6, 2024

(51) Int. Cl.
*G06T 17/20* (2006.01)
*G06T 7/38* (2017.01)

(52) U.S. Cl.
CPC ............ *G06T 17/20* (2013.01); *G06T 7/38* (2017.01); *G06T 2207/10028* (2013.01); *G06T 2207/10032* (2013.01)

(58) Field of Classification Search
CPC .. G06T 17/20; G06T 7/38; G06T 2207/10032
See application file for complete search history.

(56) References Cited

U.S. PATENT DOCUMENTS

| | | | |
|---|---|---|---|
| 2012/0019522 A1* | 1/2012 | Lawrence | G06T 17/00 345/419 |
| 2018/0046187 A1* | 2/2018 | Martirosyan | G05D 1/0094 |
| 2020/0250889 A1 | 8/2020 | Li | |
| 2021/0263515 A1* | 8/2021 | Henry | B64U 10/14 |

FOREIGN PATENT DOCUMENTS

| | | |
|---|---|---|
| CN | 120303699 A | 7/2025 |
| WO | 2020198167 | 10/2020 |

OTHER PUBLICATIONS

"International Application Serial No. PCT US2023 081872, International Search Report mailed Mar. 22, 2024", 4 pgs.
"International Application Serial No. PCT US2023 081872, Written Opinion mailed Mar. 22, 2024", 6 pgs.
Balntas, Vassileios, "Mapping the World—Part 4: SOSNet to the Rescue!", Medium, [Online]. Retrieved from the Internet: <URL: https://medium.com/scape-technologies/mapping-the-world-part-4-sosnet-to-the-rescue-53836 71713e7>, (Jun. 14, 2019), 26 pgs.
Monge, Maurizio, "Mapping the World—Part 3: Introducing 'Apophis', a lightning-fast nonlinear optimization library", Medium, [Online]. Retrieved from the Internet: <URL:https://medium.com/scape-technologies/mapping-the-world-part-3-introducing-apophis-a-lighting-fast-nonlinear-optimization-library-9f2903d47076>, (May 24, 2019), 23 pgs.
"International Application Serial No. PCT/US2023/081872, International Preliminary Report on Patentability mailed Jun. 12, 2025", 8 pgs.

* cited by examiner

*Primary Examiner* — Matthew Salvucci
(74) *Attorney, Agent, or Firm* — Schwegman Lundberg & Woessner, P.A.

(57) ABSTRACT

Systems and method for generating three-dimensional (3D) maps of physical structures are provided. A 3D mapping system can be configured to generate a 3D map of a physical structures using image data sets generated from different user devices. The mapping system can implement reference geometry into a 3D structure generation pipeline to generate more accurate 3D models.

20 Claims, 13 Drawing Sheets

AUGMENTED THREE-DIMENSIONAL STRUCTURE GENERATION

TECHNICAL FIELD

The present disclosure generally relates to data processing and, more specifically, to generating models using image data.

BACKGROUND

It is computationally difficult to generate three-dimensional (3D) maps of real-world environments. Implementing robotic and computer vision systems to map real-world environments involves significant expenditures in computer vision and robotic equipment and computationally intensive processing to generate accurate results.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

One challenge in computer vision is generating 3D maps using remotely sensed data. Examples of remotely sensed data include drone generated image or video data and remotely sensed data purchased from companies that own aerial systems (e.g., planes, satellites, in accordance with some example embodiments). To address the foregoing issues, a 3D mapping system can be configured to generate a 3D map of a real-world environment using annotation of large image data sets (e.g., end-user provided video provided by one or more end-users of a network site). The image data sets comprise terrestrial imagery that can be programmatically labeled (e.g., neural network image segmentation) with accurate labels, where the label accuracy is improved and augmented with the remotely sensed overhead image data (e.g., aerial LIDAR) and also location data (e.g., GPS data). In some example embodiments, the 3D mapping system implements photogrammetry (e.g., Alice Vision, Call Open) to create a point cloud from images (e.g., video clips of a city). Each pixel in the point cloud can be classified based on a consensus of each frame of a given video. The point cloud can be co-registered to a remotely sensed reference dataset (e.g., aerial device provided data) to provide precise spatial coordinates for each pixel. Different patches of the point cloud can be stitched together to provide a complete 3D map for a given area, such as a downtown area of a city.

Figure 1:
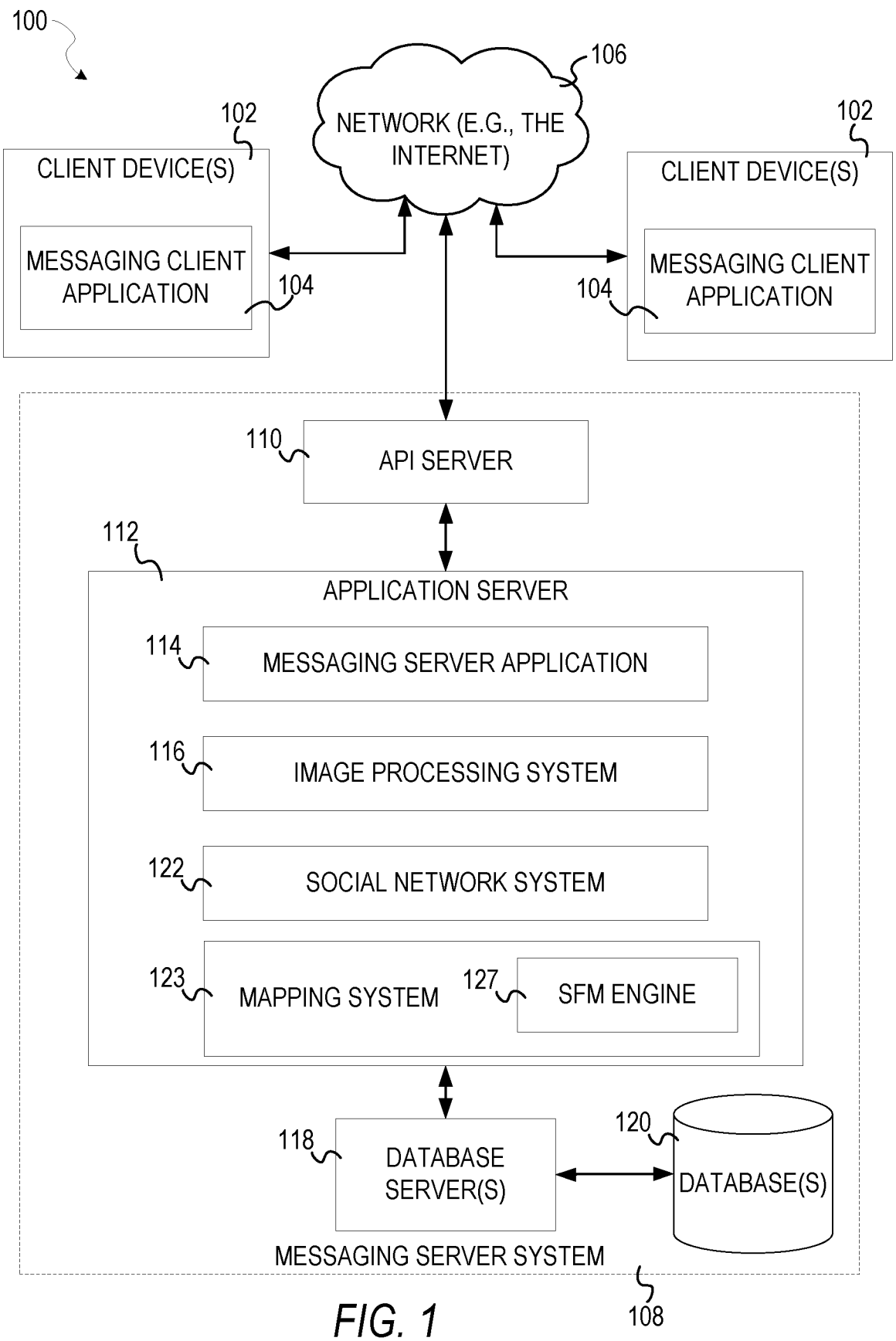
FIG. 1 is a block diagram showing an example messaging system for exchanging data (e.g., messages and associated content) over a network, according to example embodiments.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, A mapping system 123 and a structure from motion engine. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user. The application server 112 is communicatively coupled to a database server 118, which facilitates access to a database 120 in which is stored data associated with messages processed by the messaging server application 114. The mapping system 123 is configured to generate 3D maps from disparate image sources, as discussed in further detail below.

Figure 2:
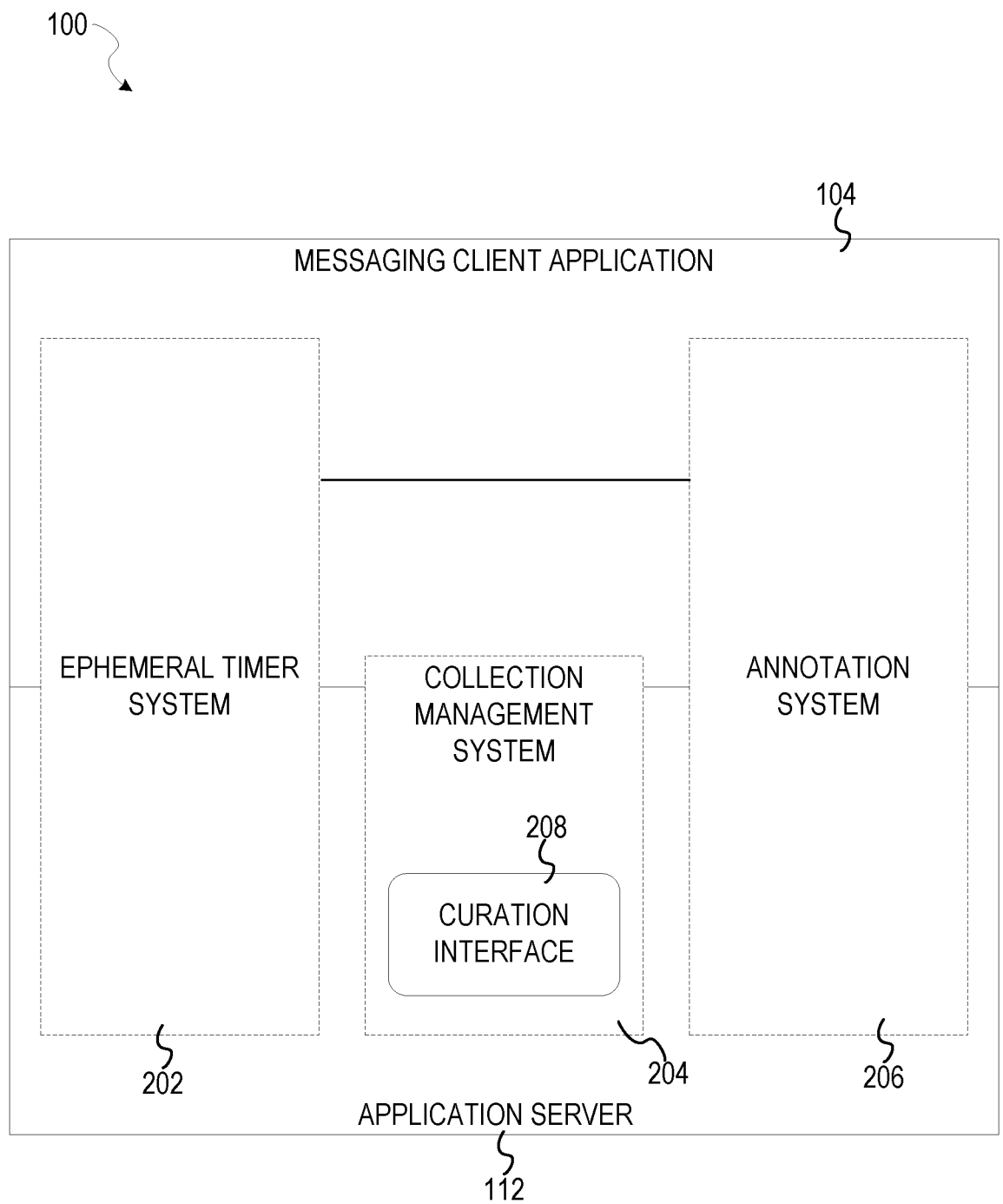
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
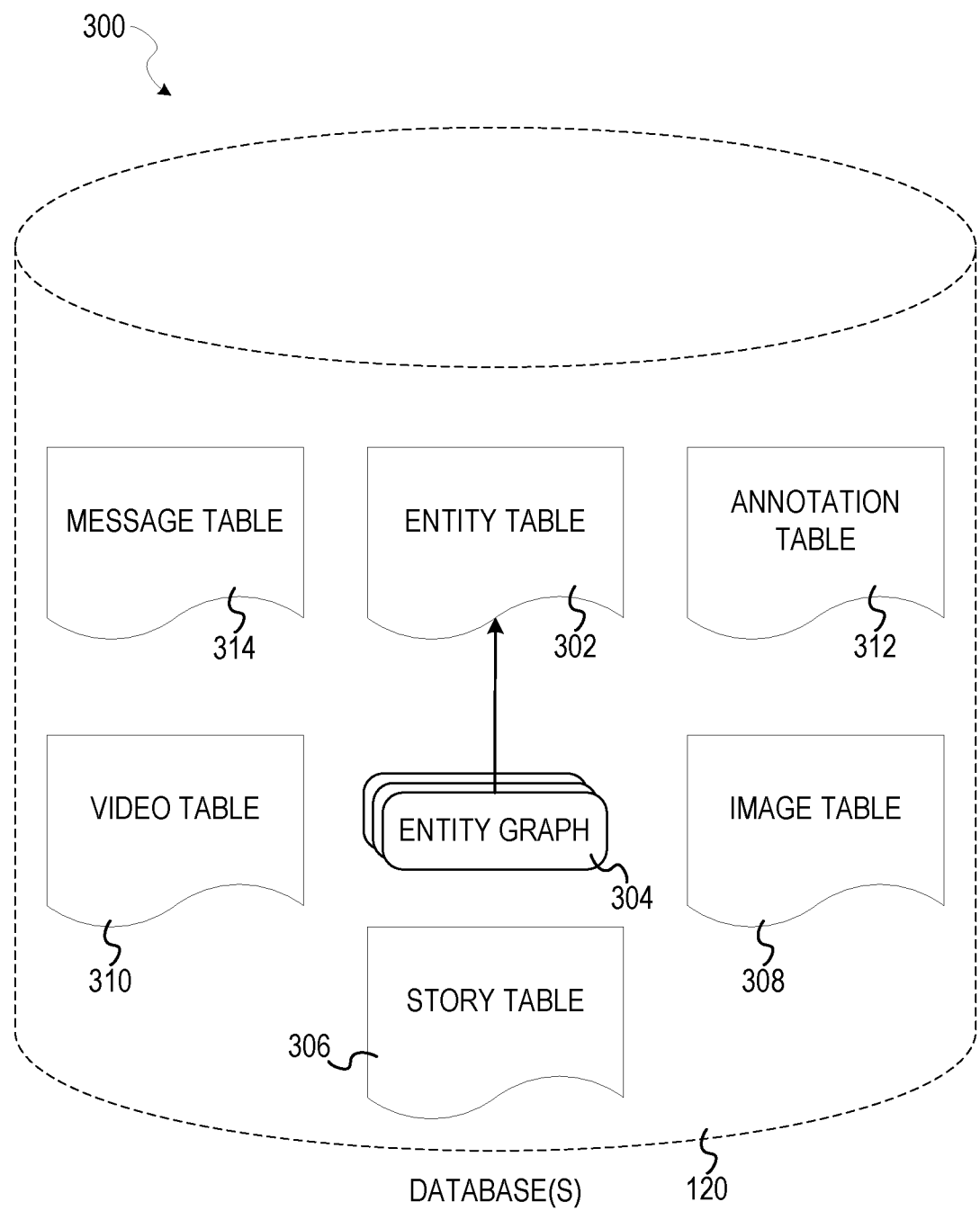
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database). The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
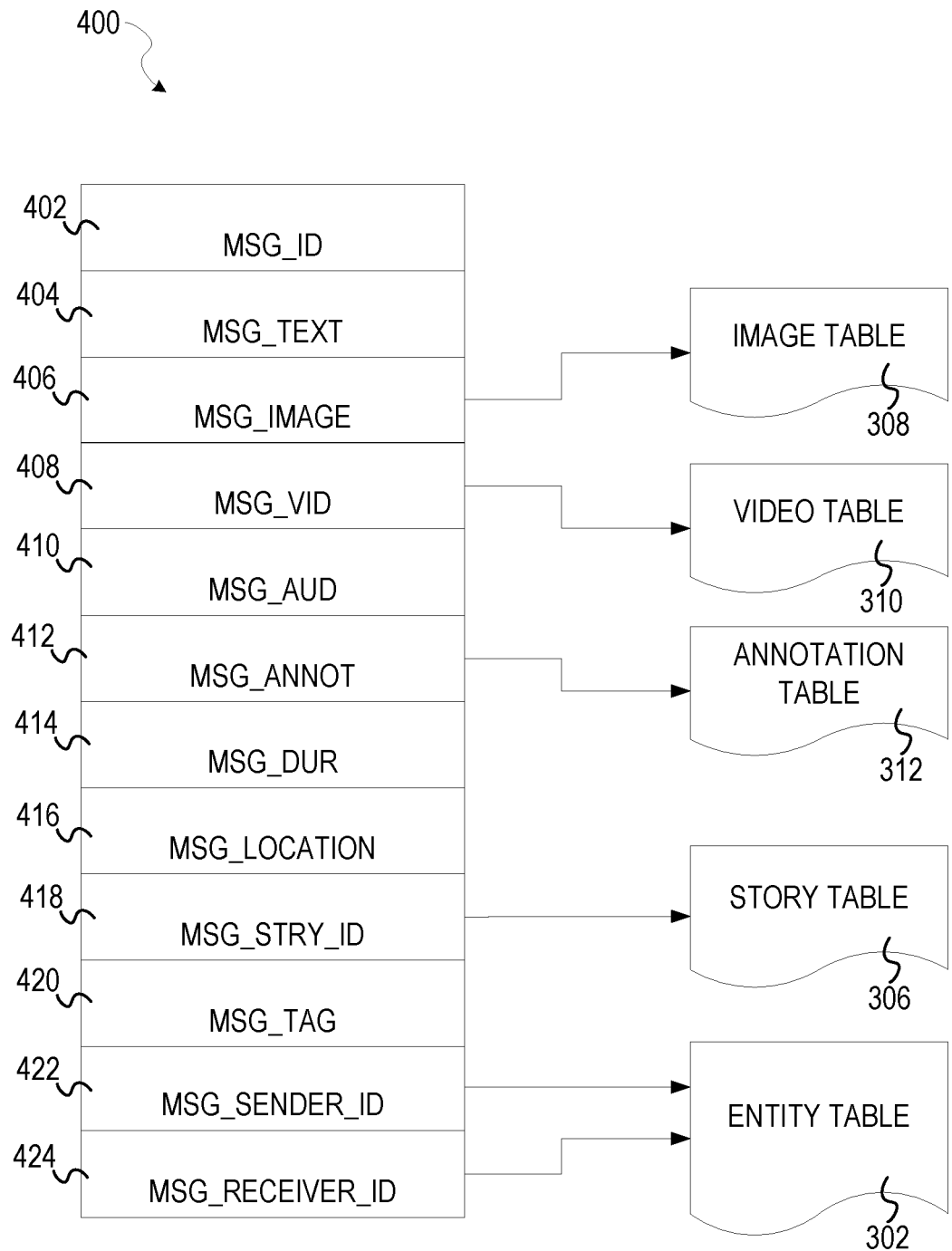
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data captured by a camera component of a client device 102 or retrieved from memory of a client device 102, and that is included in the message 400.
- A message video payload 408: video data captured by a camera component or retrieved from a memory component of the client device 102, and that is included in the message 400.
- A message audio payload 410: audio data captured by a microphone or retrieved from the memory component of the client device 102, and that is included in the message 400.
- Message annotations 412: annotation data (e.g., filters, stickers, or other enhancements) that represents annotations to be applied to the message image payload 406, message video payload 408, or message audio payload 410 of the message 400.
- A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.
- A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).
- A message story identifier 418: values identifying one or more content collections (e.g., "stories") with which a particular content item in the message image payload 406 of the message 400 is associated. For example, multiple images within the message image payload 406 may each be associated with multiple content collections using identifier values.
- A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.
- A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
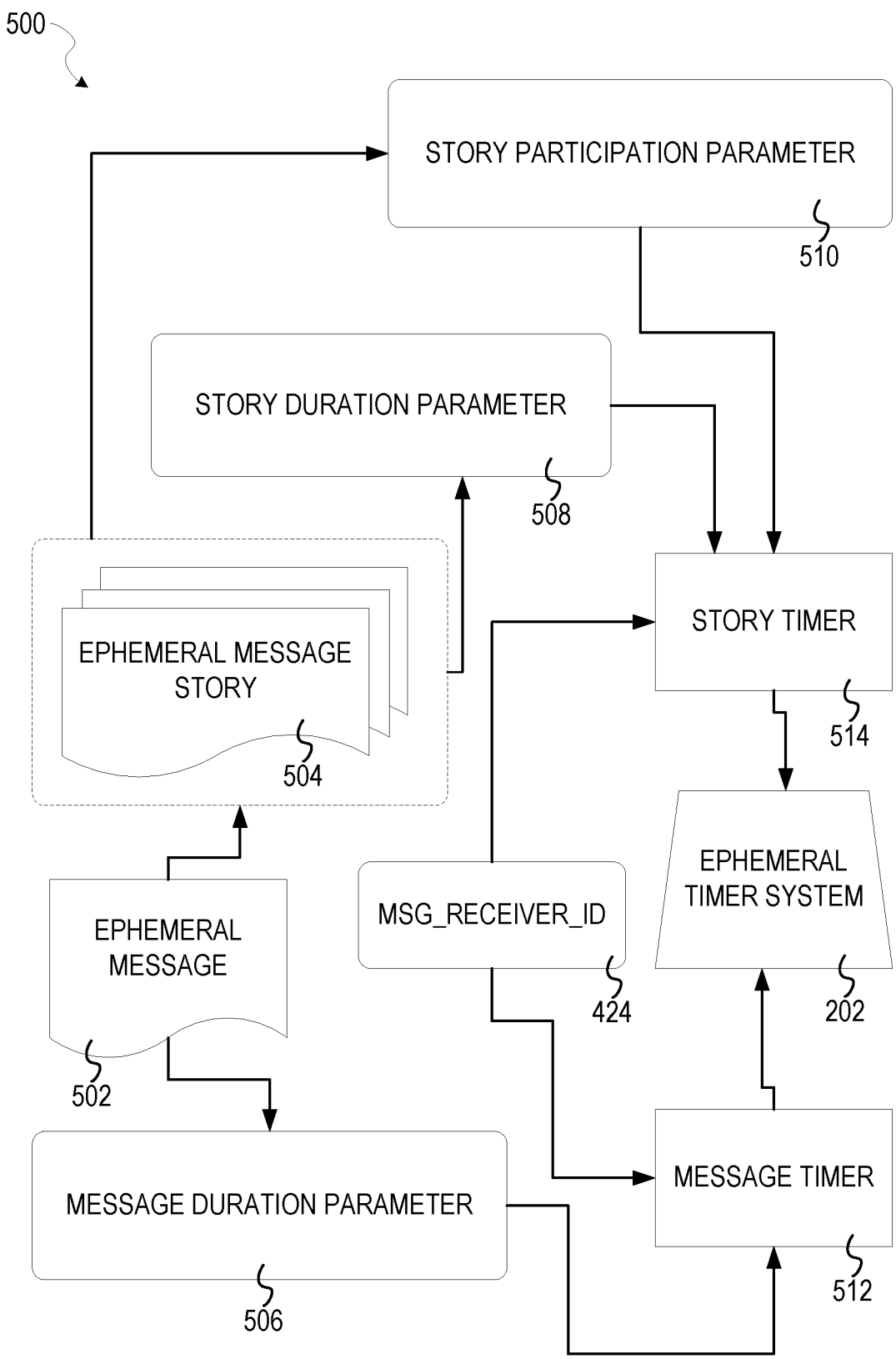
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

The following is an example implementation of the mapping system 123, in accordance with some example embodiments. First, the mapping system 123 performs semantic segmentation classifier training (e.g., image segmentation neural network) on frames from video, such as frames from video social media posts or a client device generated video. For example, the mapping system 123 generates programmatic labels for each frame using a machine learning classifier that is trained to generate image segmentation labels for terrestrial based images (e.g., image data generated from terrestrial based cameras, such as client devices). Second, the mapping system 123 places the semantically labeled image data into geographic space by converting the image frames into point clouds using a photogrammetric computer vision scheme, such as Alice Vision. One issue with converting to point clouds is the inaccuracy of the geographic information contained in terrestrial based sources (e.g., side-perspective video, GPS data). In some example embodiments, to address insufficient accuracy, the mapping system 123 uses external spatial reference data sets (e.g., aerial data) to assist geographic rectification of the point cloud. In some example embodiments external reference data is provided from different forms such as aerial generated visual datasets. That is, to address the insufficient accuracy issues, the mapping system 123 implements an external spatial reference data set to assist georectification of the terrestrial-generated point cloud. The external reference could take a variety of forms, such as aerial LiDAR, point clouds that are derived from aerial or satellite oblique based imaging techniques, high-resolution synthetic aperture radar (SAR) or other remotely sensed sources. In some example embodiments, the mapping system 123 pre-processes the point clouds by dividing the video frames into segments (e.g., five second segments) and constructing 3D point clouds in a photogrammetry pipeline (e.g., implementing a photometric imaging scheme, SfM). An example photogrammetry pipeline comprises (1) camera initiation, (2) followed by image feature extraction, (3) followed by image matching, (4) followed by future matching, (5) followed by performing structure from motion (SfM), in accordance with some example embodiments. SfM involves estimating a 3D structure of a scene from a set of two dimensional images. SfM data can be generated in different ways based on different factors, such as the number and type of cameras used, whether the images are ordered, and whether the images are taken from different cameras (e.g., cameras of different user devices).

In some example embodiments, in order to co-register the point cloud to the external spatial reference, the mapping system 123 maximizes a number of possible point matches between the external reference data and the terrestrial based point cloud via densification. In some example embodiments, the additional densification processing is performed due to the two data sets being disparate data sets that are collected from different perspectives, such as orthogonal viewpoints (e.g., a side perspective and a top-down perspective). In some example embodiments, image registration between multiple images (e.g., co-registration) is an image processing technique used to align multiple scenes into a single integrated image.

In some example embodiments, to address these difficulties, the mapping system 123 increases a number of potential points matched by identifying (e.g., interpolating) the aerial data source and the terrestrial data source. In some example embodiments, for the aerial data source, the mapping system 123 densifies point data corresponding to the façades (e.g., sides) of buildings to improve the aerial provided data, because the vertical surfaces (e.g., walls, sides of buildings) often receive few generated points in a given area of collection due to the top-down perspective of the data collecting device. In some example embodiments, the mapping system 123 then semantically segments the LiDAR or 3D point clouds to determine building structures and ground structures. In some example embodiments, the mapping system 123 implements a machine learning neural network trained on the semantically segmented point clouds to perform densification (e.g., neural network based interpolation of points to densify and generate interpolated points).

In some example embodiments, the mapping system 123 then densifies the terrestrial photogrammetry derive point clouds, using a terrestrial densification pipeline comprising: (1) depth mapping, (2) followed by depth map filtering, (3) followed by meshing, (4) followed by mesh filtering. The results of the pipeline generates an improved set of terrestrial point cloud candidates that can be more readily co-registered to the reference external spatial data set (e.g., enhanced reference LiDAR point cloud from one or more aerial devices).

Figure 8:
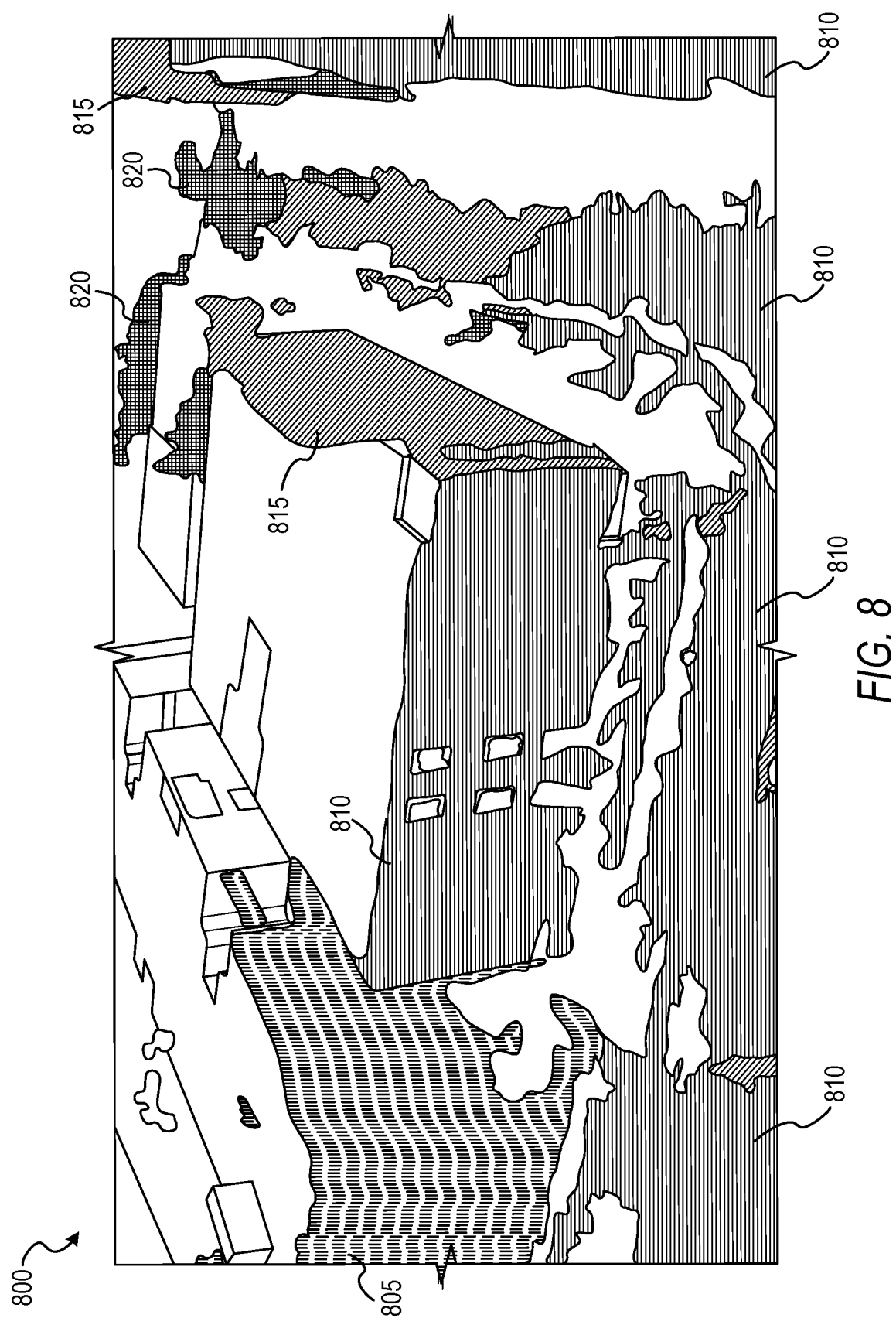
FIG. 8 shows a 3D map generated from disparate data, according to some example embodiments.

In some example embodiments, co-registration of the two data sets comprises first leveraging GPS data to derive telemetry for approximate point cloud positioning, then performing odometer-based alignment of the SfM point clouds, and then performing pose graph optimization of the SfM point clouds to the external spatial reference data. In this way, the mapping system 123 locks the SfM derived point clouds to a robust spatial reference. In some example embodiments, the mapping system 123 then stitches together each of the SfM point clouds to each other to create a seamless panoramic tapestry for a blended 3D point cloud of a geographic location, such as a downtown area of the city as illustrated in FIG. 8, in which each terrestrial point cloud is colored or shaded differently (e.g., one client device generates images of a building from the right, another from the left, and so on).

One advantage of the segmentation and co-registration processes is that each independent point cloud used to generate a 3D map is relatively small, and therefore does not require a large amount of computation to derive. In this way, when different point clouds are stitched together to generate the 3D mapping, the smaller SfM models ensure that errors do not propagate far (e.g., into adjacent point clouds which can spread error). In this way, each terrestrial point cloud's local errors are never correlated with their adjacent SfM models (e.g., terrestrial point clouds derived from other client devices). Further, in some example embodiments, image chips (e.g., image fragments of an image or video frame)) from the image frames of the client devices that are used to generate the terrestrial point clouds are then stitched (e.g., projected, applied as a surface texture) to the 3D map of FIG. 8, such that the 3D map has a more realistic photographic appearance. In this way, the mapping system generates high accuracy point clouds from commodity cameras (e.g., client device cameras) via enhancement from external spatial reference data sets.

Figure 6:
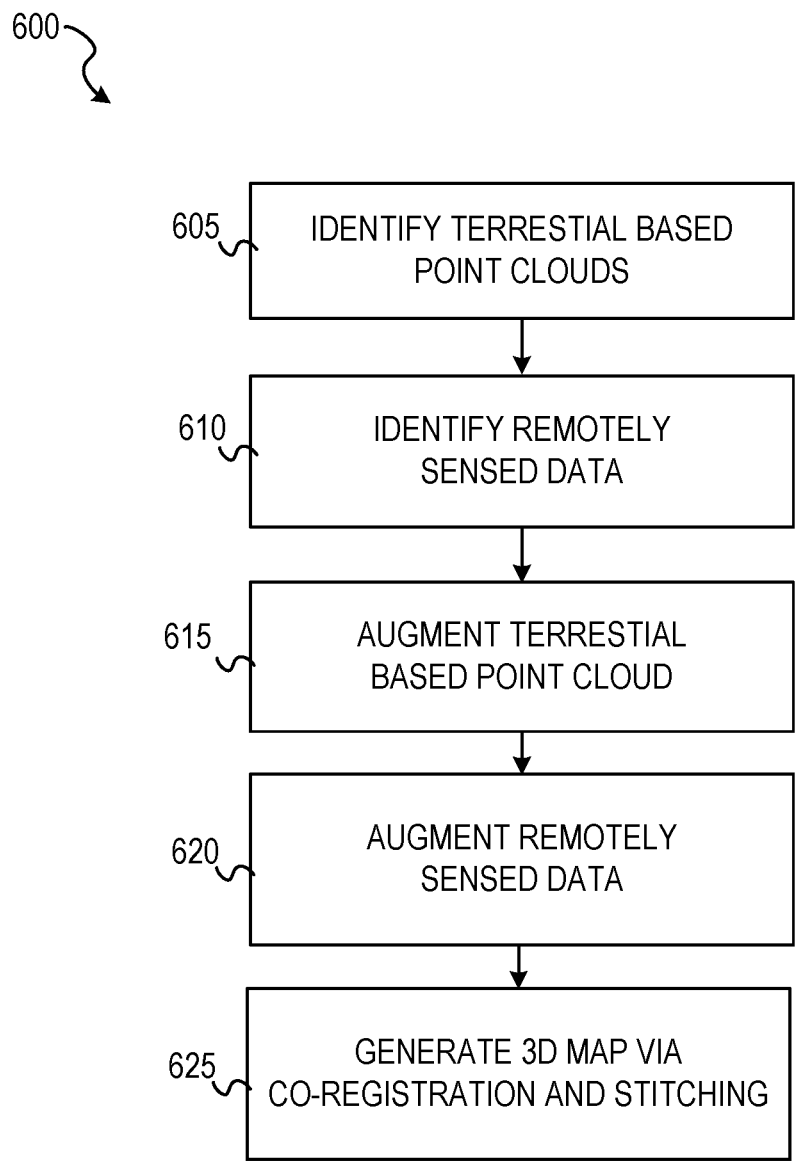
FIG. 6 shows an example flow diagram for generating a map from disparate image sources, according to some example embodiments.

FIG. 6 shows an example flow diagram of a method 600 for generating 3D maps using the mapping system 123 via registration of disparate image sets (e.g., terrestrially based point clouds, aerial based point clouds) generated from orthogonal perspectives, according to some example embodiments. At operation 605, the mapping system 123 identifies the terrestrial point cloud data sets. For example, a plurality of client user devices generate video data of different portions of a geographic location (e.g., a city's downtown area), a point cloud is generated from each client device's video data, and the multiple point clouds are identified by the mapping system 123 for further processing.

At operation 610, the mapping system 123 identifies remotely sensed data. At operation 615, the mapping system 123 augments the terrestrial point cloud data (e.g., densifies the point cloud, neural network based densification to add further points between sparse points).

At operation 620, the mapping system 123 augments a set of remotely sensed data, such as aerial device data of the geographic location taken from a top-down perspective. In some example embodiments, the mapping system 123 augments the remotely sensed data via interpolation (e.g., densification) to densify façades of vertical surfaces (e.g., buildings' exterior walls) captured in the remotely sensed data.

At operation 625, the mapping system 123 generates a 3D map of the physical environment. In some example embodiments, the mapping system 123 generates the 3D map by co-registering the augmented terrestrial point cloud data sets to the augmented remotely sensed data. The co-registering of each augmented terrestrial point cloud data set stitches the patches to each other and with the remotely sensed data to create an accurate 3D map.

Figure 7:
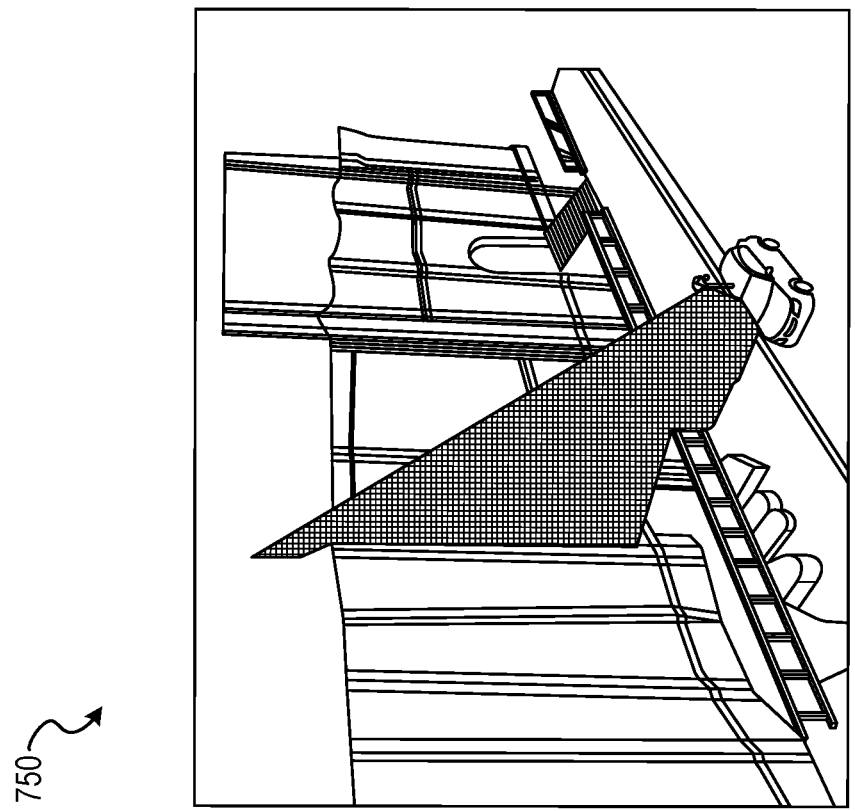
FIG. 7 shows devices generating disparate sets of image data from orthogonal perspectives, according to some example embodiments.
Figure 7:
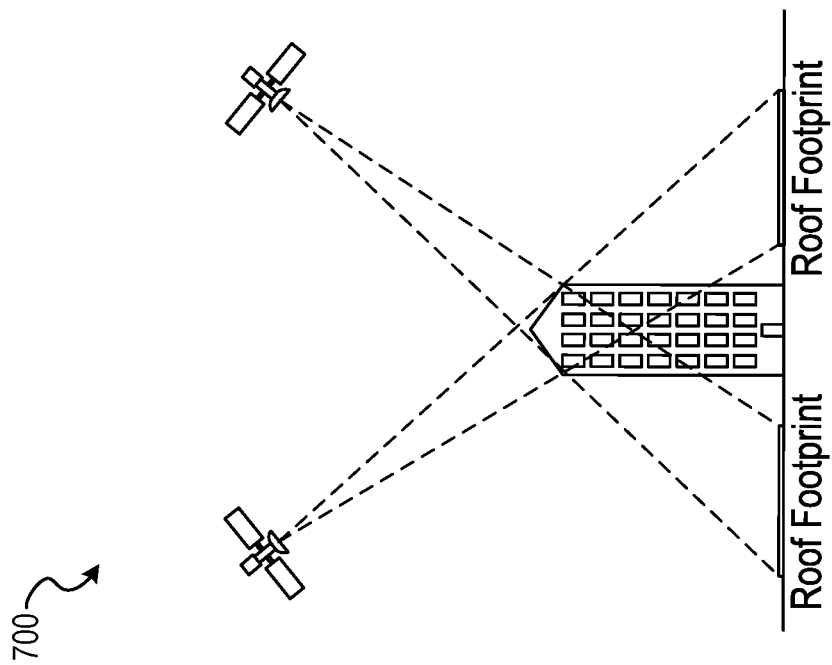

FIG. 7 shows an example of disparate datasets, such as different image data from orthogonal perspectives, according to some example embodiments. In the example top perspective 700, the remotely sensed data comprises data (e.g., images, video, ranging data, point clouds) generated from a top-down perspective. Different remote devices can provide the remotely sensed data, such as planes or satellites that physically move above a geographic location and generate the remotely sensed data using LIDAR or imaging devices (e.g., Complementary metal-oxide-semiconductor (CMOS) camera). In the example side perspective 750, the local data comprises data (e.g., images, video, ranging data, point clouds) generated from terrestrial devices that generate data from a side perspective. Different devices can provide the local data, such as user devices (e.g., smartphones, cameras, car-based imaging systems, ranging systems such as Lidar).

FIG. 8 shows an example 3D map 800 generated of a geographic area (e.g., downtown Boulder, Colorado) that is generated by the mapping system 123, in accordance with some example embodiments. In the illustrated example of FIG. 8, the 3D map 800 is shaded with different patterns to indicate areas of the 3D map 800 that correspond to different point clouds generated from different terrestrial devices (e.g., different end-user devices). The different point clouds depict buildings, streets, and other physical features of a geographic area, such as downtown Boulder, Colorado. For example, a first user device (not depicted) generates video data while a user of the device is stationary or walks around the geographic area, and the video data is then used to create a first SfM-based point cloud area 805, via photometric pipeline, where the processing is implemented as discussed above (e.g., augmentation and co-registration with remotely sensed data), in accordance with some example embodiments Further, a second user device (not depicted) generates video data while a second user of the second user device is stationary or walks around the geographic area, and the second video data set is then used to create a second SfM-based point cloud area 810 (e.g., which is processed and augmented via the remotely sensed data as discussed above). Further, a third user device (not depicted) generates a third video data set while a third user of the third user device is stationary or walks around the geographic area, and the third video data set is then used to create a third SfM-based point cloud area 815 (e.g., which is processed and augmented via the remotely sensed data as discussed above).

Further, a fourth user device (not depicted) generates a fourth video data set while a fourth user of the fourth user device is stationary or walks around the geographic area, and the fourth video data set is then used to create a fourth SfM-based point cloud area 820 (e.g., which is processed and augmented via the remotely sensed data as discussed above). The resulting point clouds can then be stitched together to create the map 800 (e.g., a full 3D panoramic map of the geographic area) In some example embodiments, the video data sets are clips of social media posts (e.g., ephemeral messages), while in other example embodiments, the video data sets comprise video data created from commodity off the shelf consumer imaging solutions, such as video recorders, digital single lens reflex camera (DSLR) or mirrorless cameras.

As discussed above, one benefit of the independently derived point cloud areas 805, 810, 815, and 820 is that the error is localized into individual point cloud areas and does not spread into adjacent areas. This can be beneficial where, for example, one of the point clouds is inaccurate (e.g., due to poor quality video or aerial data), while still enabling creation of a highly useful 3D map 800.

In some example embodiments, the 3D map 800 does not display the different patterns of the different point clouds and instead image chips (e.g., image fragments) of the video data are applied as an image texture to the 3D map 800 so that the 3D map 800 appears more photo-realistic.

In some example embodiments, the mapping system 123 implements an improved structure from motion engine 127 to generate accurate 3D map results data such as 3D point cloud data and 3D pose data (e.g., image pose data of predicted camera frustrum locations for each of the images used in the SfM processing). In some example embodiments, SfM involves detecting and matching features between images or video frames, tracking the features across frames, triangulating 3D points and 3D geometry to generate the 3D points o of a point cloud that maps to a given structure, as well as the position poses of images (e.g., video frames of video social media posts) that are used to create the map 800.

In some example embodiments, structure from motion involves bundle adjustment optimization processes. Bundle adjustment involves a combined optimization of the geometries of the 3D point cloud that makes up the structures (e.g., geographic location or scene) and the 3D poses of the images being used to generate the SfM results data. In particular, for example, bundle adjustment optimizes pose (e.g. pose data comprising one or more structures of buildings and position of the images that are being used to generate the SfM data). One constraint in implementing bundle adjustment optimizations involves minimization of reprojection error. Reprojection error involves reprojecting the generated 3D position data into the current best estimate of the images locations and poses (e.g., images, video frames) to determine how well the points and data line up. Errors can arise for the detected point cloud pixel locations due to inherent noise in the process, and as the errors build up as the bundle adjustment processes is applied to many images, the final 3-D structure begins to warp or drift away from what it should look like (e.g., warped 3D street whereas the real-world 3D street is straight).

To address the foregoing issues, the structure from motion engine 127 is configured to reduce the noise that causes reprojection error thereby creating more accurate 3-D models. In some example embodiments, the structure from motion engine 127 integrates external reference data (e.g., remotely sensed data) into the bundle adjustment optimization processes of SfM as a guide in the adjustment processes to make sure the generated 3D point data matches the external provided data (e.g., make sure the SfM-3D generated map looks the same as the external reference data). In some example embodiments the external reference data is remotely sensed data discussed above (e.g., aerial lidar data, aerial point clouds), or other sorts of data, such as stored 3D meshes of the structures being modeled via mapping system 123. In this way, the structure from motion engine 127 ensures at the results data generated by the mapping system 123 a 3-D reference data should be as close to each other as possible: the output from the two should be the same 3-D point cloud date of the triangulated geometry, as well as a 3-D pose data for all the input imagery (e.g., images used by the mapping system 123 to generate the map 800). The resulting 3-D map can then be used for further end-user experiences, such as augmented reality social media posts that can be posted on a social media site as ephemeral messages (e.g., ephemeral message 502), in accordance to some example embodiments. For example, the map data can comprise one or more 3D building models of a city's down town that can be used to generate social media posts depicting a cartoon 3D dinosaur walking down the street and climbing one of the buildings (e.g., as viewed through the client device), and the users can record and then post video clips of the dinosaur on a social media site.

At a high level, structure from motion is a computational technique for estimating three-dimensional structures from two-dimensional image sequences. An output can include a 3-D pose for each image and a 3-D point cloud where each 3-D point in the point cloud has descriptions of its appearance in two or more images (e.g., location data of the point in the two or more images). In accordance with some example embodiments, the structure from motion engine 127 generates structure from motion data (e.g., 3D map, point cloud data, and image pose data) as follows: (a) detect image features (e.g., corner points) in each image of an image sequence (e.g., a video sequence of a social media post), (b) match features between the different images, (c) generate relative pose data of image pairs with the features matched, (d) starting with an initial image pair, triangulate image features to estimate 3-D locations of the image features, and (e) iteratively register new images and optimize the reconstruction. In some example embodiments the iterative registration and optimization process includes some operations comprising: (e1) match image features against the current 3-D point cloud, (e2) triangulate the new images to add new points to the 3D point cloud, and (e3) perform bundle adjustment by optimizing image poses and 3-D point locations at the same time (e.g., simultaneous in a single loss process, in concert).

Bundle adjustment can be implemented as an optimization task within the SfM processes. Bundle adjustment processes can refining a set of camera parameters (e.g., image poses and camera intrinsic) and structure parameters (e.g., 3D point locations) to find the set of parameters that most accurately predict the locations of the observed 3D points in the set of available images. In particular, for example, assume that n 3D points are seen in m views and let $x_{ij}$ be the projection of the ith point on image j. Let $v_{ij}$ denote the binary variables that equal 1 if point i is visible in image j and 0 otherwise. Assume also that each camera j is parameterized by a vector $a_j$ and each 3D point i by a vector $b_i$. Bundle adjustment minimizes the total reprojection error with respect to all 3D point and camera parameters:

$$\min_{a_j, b_i} \sum_{i=1}^{n} \sum_{j=1}^{m} v_{ij} d(Q(a_j, b_i), x_{ij})^2 \qquad \text{Equation 1}$$

, where $Q(a_j, b_i)$ is the predicted projection of point i on image j and $d(x, y)$ denotes a distance metric between the projected and measured image points. The distance metric can be pure Euclidean distance or make use of a more robust loss function.

As detailed above, the structure from motion engine 127 is implements Bundle Adjustment to minimize reprojection error (e.g., the distance between a 3D point reprojected into an image in which it was observed and the location of that observation within the image). In some example embodiments, this optimization can be highly dependent on the measured locations of features within images. Noise in these estimated feature locations, along with other unmodeled sources of error, can cause long-range drift in estimated image poses, resulting in warped and geometrically inaccurate 3D reconstructions.

Figure 9:
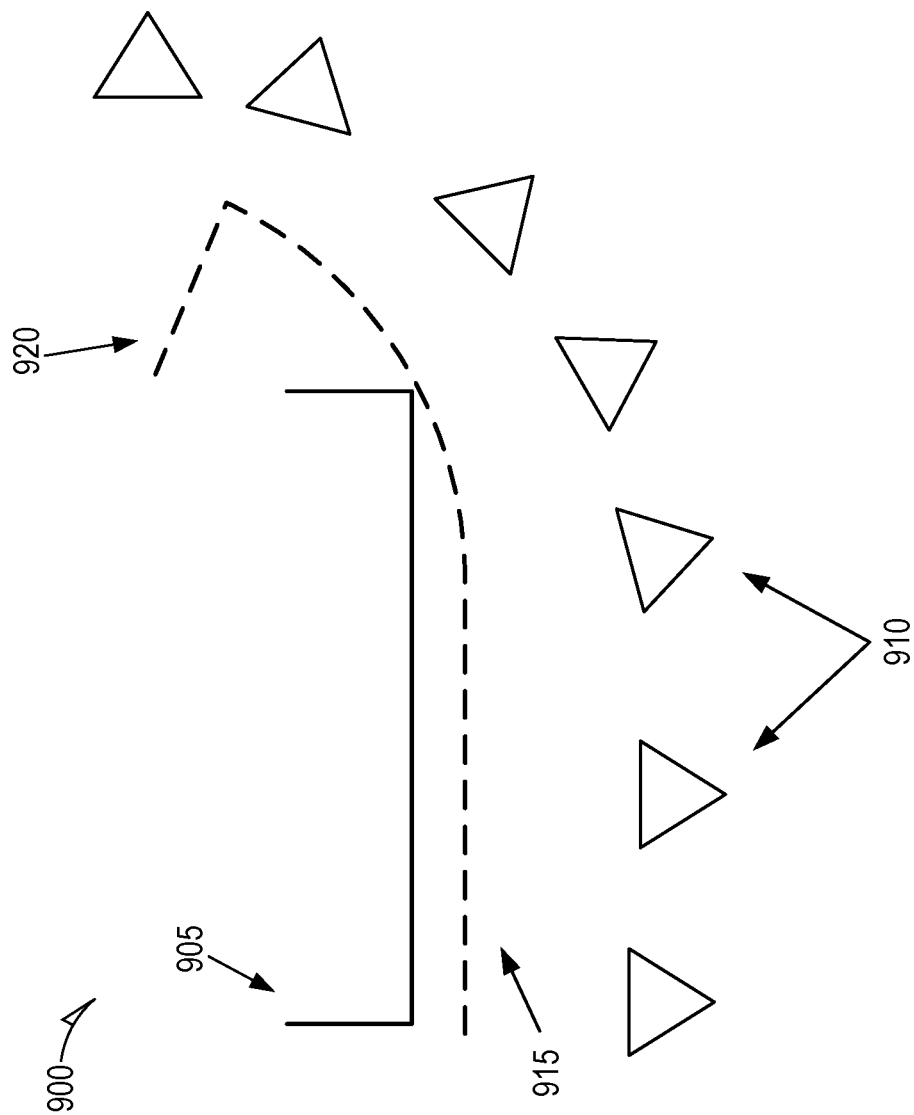
FIG. 9 shows an illustration of long range drift in a structure from motion reconstruction, in accordance with some example embodiments.

FIG. 9 shows an illustration 900 of long range drift in a structure from motion reconstruction, in accordance with some example embodiments. In particular, the real scene geometry 905 corresponds to real-world structures (e.g., buildings streets). The structure from motion engine 127 can receive input images which are used as camera frustrums 910 which represent reconstructed image poses. The structure from motion engine 127 then generates reconstructed 3-D points (e.g., a point cloud) that should match the real scene geometry 905. However, as illustrated by drift 920 a portion of the reconstructed points comprises drift which is occurring from warped reconstruction. As shown, the reconstructed 3-D points no longer accurately represent the real scene or real scene geometry.

In some example embodiments, the structure from motion engine 127 is configured to perform bundle adjustment such that the bundle adjustment processes it minimizes both reprojection error and the distance between 3D points and their correspondences in a reference geometry (e.g., aerial lidar). In some example embodiments, the structure from motion engine 127 is configured to implement bundle adjustment as follows:

$$\min_{a_j, b_i} \sum_{i=1}^{n} \sum_{j=1}^{m} v_{ij} d(Q(a_j, b_i), x_{ij})^2 + \sum_{i=1}^{n} l(b_i, c_i) \quad \text{Equation 2}$$

, where ci is the reference geometry correspondence for 3D point i and l(x, y) denotes a distance metric between 3D points and their correspondences in the reference geometry. In some example embodiments, the distance metric is a Euclidean distance. In some example embodiments, the distance metric is configured to implement a robust loss function to mitigate the impact of outlier correspondences (e.g., outlier corresponding points). In some example embodiments, the distance metric is configured to implement orientation data, shape data, and color information data for correspondences and minimization processing.

Figure 10:
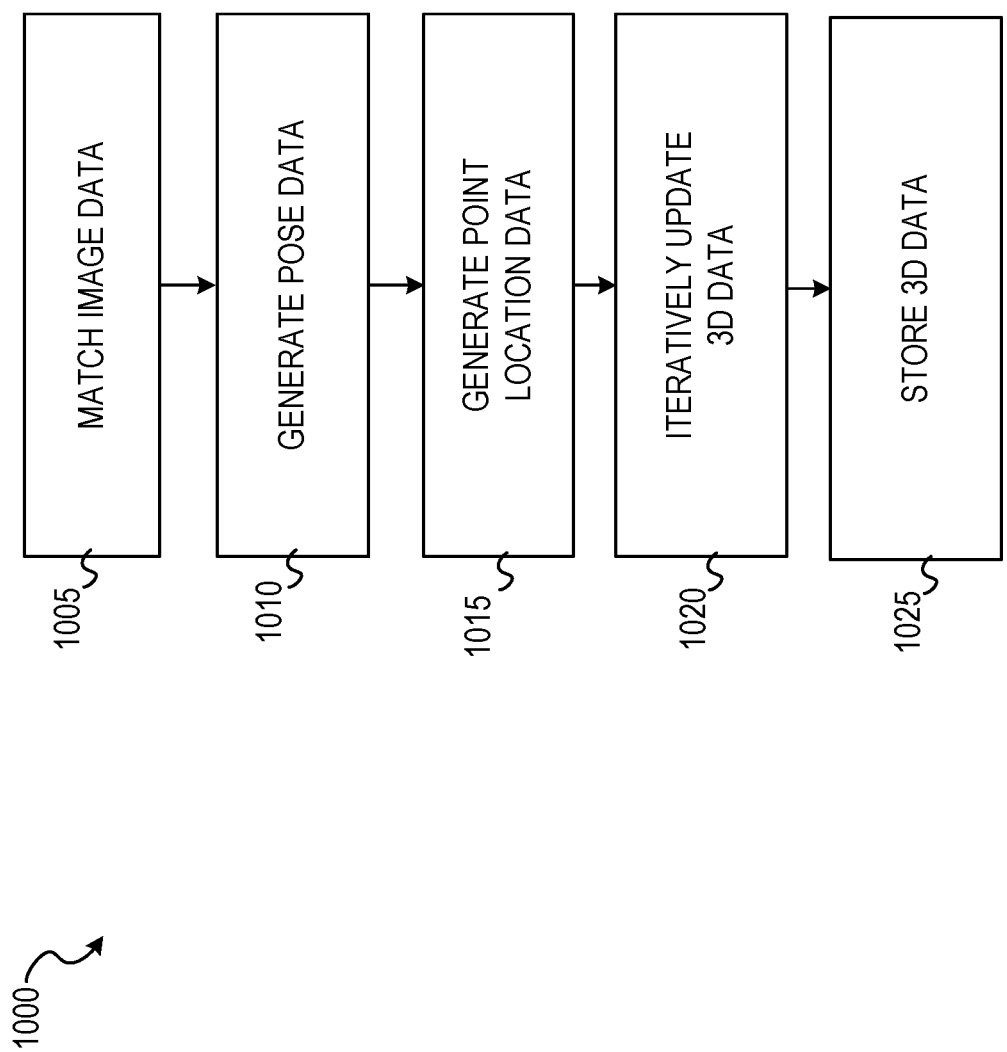
FIG. 10 shows an example flow diagram of a method for implementing structure from motion to generate improved 3D data from image data, in accordance with some example embodiments.

FIG. 10 shows an example flow diagram of a method 1000 for implementing structure from motion to generate improved 3D data from image data, in accordance to some example embodiments. At 1005, the structure from motion engine 127 matches image data. For example, the structure from motion engine 127 detects image features (e.g., such as corner points) in each image performs matching of features between different images.

At operation 1010, the structure from motion engine 127 generates pose data. For example, the structure from motion engine 127 estimates the relative poses of image pairs with feature matches (e.g., estimate to view geometry such as relative frustrum poses between image pairs). At operation 1015, the structure from motion engine 127 generates point location data. For example, starting with an initial image pair, the structure from motion engine 127 triangulate image features to estimate the 3-D location of the image features to triangulate 3-D points.

At operation 1020, the structure from motion engine 127 iteratively updates the generated 3-D data. For example, at operation 1020 the structure from motion engine 127 iteratively registers new images and optimizes the resulting reconstruction for each image to be processed (e.g., new video posts from a social media site). In some example embodiments, to perform iterative updates at operation 1020, the structure from motion engine 127 performs the following for each image iteration: (a) match image features against the current 3-D point cloud, (b) triangulate the new image to add new points to the 3D point cloud, (c) detect correspondences between the reconstructed point cloud and the reference geometry. And some example embodiments, correspondences are found using combinations of position, orientation, shape, and color, and (d) perform an extended bundle adjustment optimization in which the reprojection error is minimized and also the distance between 3-D points and their correspondences (e.g., corresponding points on the building) is minimized using the reference geometry (e.g., aerial lidar data, mesh reconstructions of a building).

Figure 11:
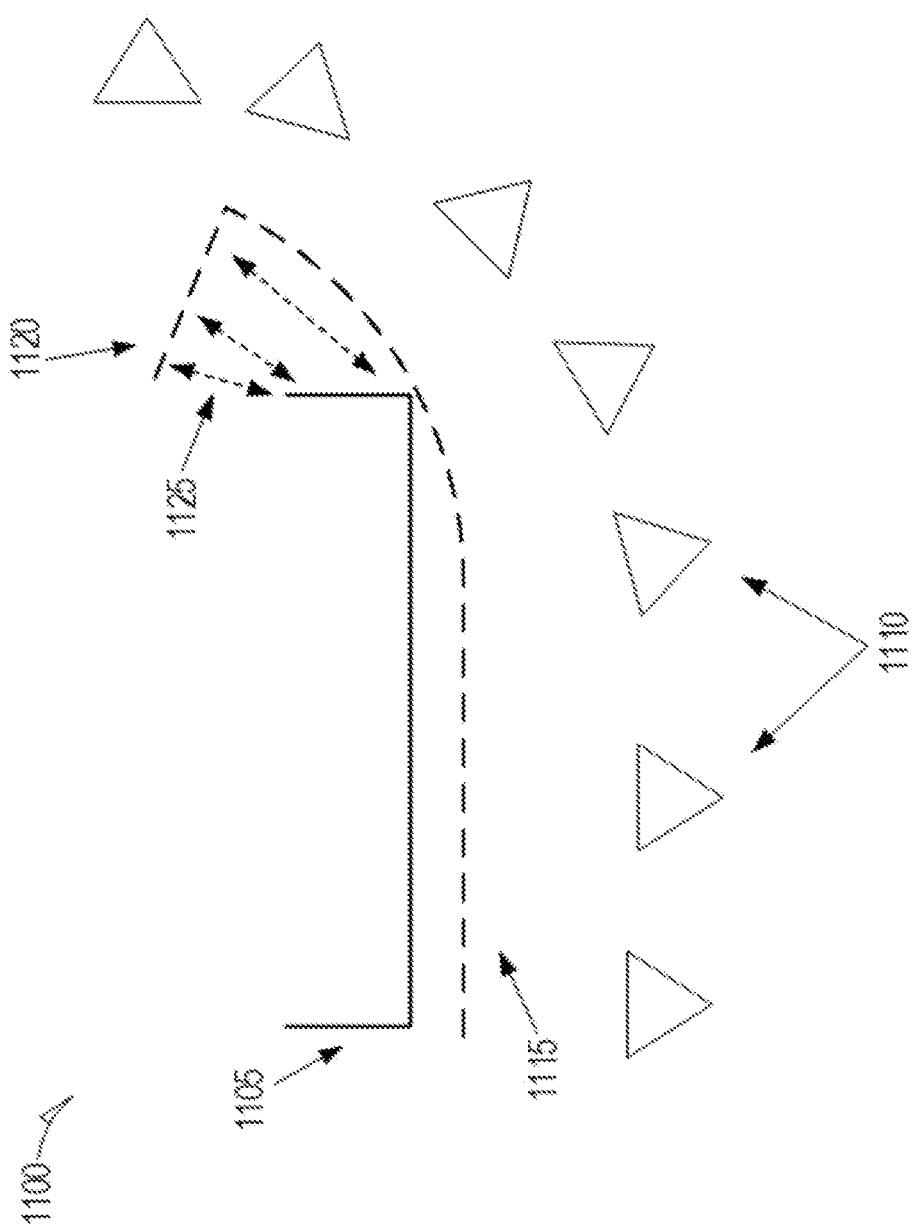
FIG. 11 shows an illustration of minimizing errors in SfM constructed data, and according to some example embodiments.

FIG. 11 shows an illustration 1100 of minimizing errors in SfM constructed data, and according to some example embodiments. In the example illustrated, reference geometry data 1105 is reference data (e.g., accurate aerial lidar point clouds) of real world geometry and structures. The structure from motion engine 127 implements user images as the camera frustrums 1110 to represent reconstructed image poses where the images are implemented using structure from motion to generate the reconstructed 3-D point cloud 115 which has an inaccurate warped shaped 1120 due to errors 1125 (e.g., errors between reconstructed 3-D points in the reference geometry), as discussed above. In some example embodiments, the structure from motion engine 127 is configured to minimize both reprojection errors and distances between the reconstructed 3-D points in the correspondences in the reference geometry data 1105.

Figure 12:
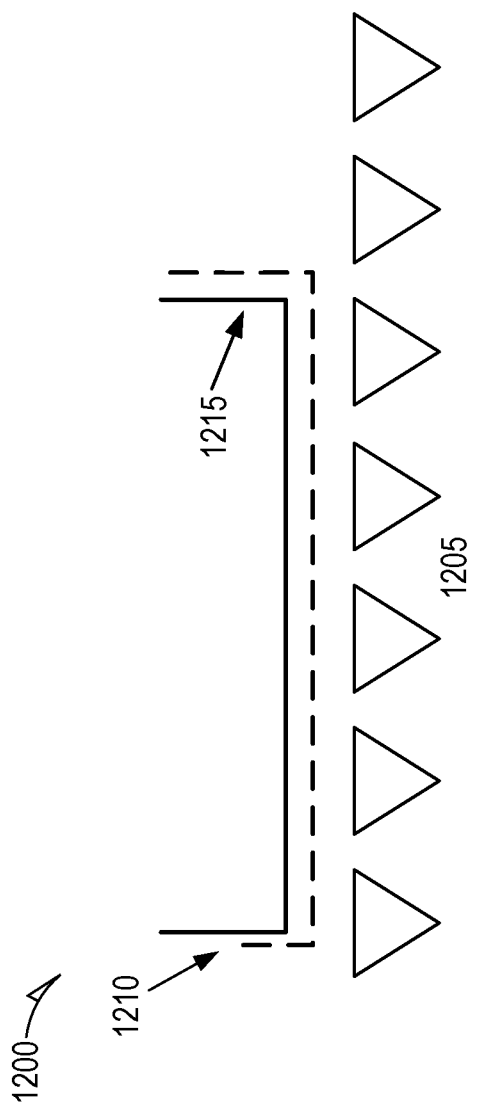
FIG. 12 shows an illustration of improved 3D data, in accordance with some example embodiments.

FIG. 12 shows an example architecture for improved 3D data, in accordance with some example embodiments. In the example illustrated, the structure from motion engine 127 implements reference data as discussed above (e.g., method 1000) such that the camera frustrums (e.g., of images) are uniform and there is good alignment between the reconstructed and iteratively updated 3-D point cloud 1210 in the reference geometry 1215, thereby correcting the warping from long-range drift.

The following are example embodiments:

Example 1. A method comprising: identifying terrestrial source image data generated using a plurality of client devices; identifying aerial based image data that is generated from an orthogonal perspective relative to the terrestrial source image data; generating enhanced terrestrial source image data by correlating points of the terrestrial source image data and the aerial based image data; generating a three-dimensional map from the enhanced terrestrial source image data, the 3D map comprising stitched portions of enhanced terrestrial source image data sets from different client devices of the plurality of client devices.

Example 2. The method of example 1, wherein the terrestrial source image data comprises a plurality of point clouds.

Example 3. The method of any of the examples 1 or 2, wherein the plurality of point clouds are generated by applying an imaging scheme to video sequences generated by the plurality of client devices.

Example 4. The method of any of the examples 1-3, wherein the imaging scheme is a photometric imaging scheme that generates point cloud data from image data.

Example 5. The method of any of the examples 1-4, wherein the aerial based image data is generated by aerial vehicles.

Example 6. The method of any of the examples 1-9 wherein the aerial based image data comprises aerial lidar data that images a ground from a top-down perspective.

Example 7. The method of any of the examples 1-9 further comprising: enhancing the terrestrial source image data by performing densification to add image details using interpolation.

Example 8. The method of any of the examples 1-9 wherein a machine learning scheme is trained to perform densification to the terrestrial source image data.

Example 9. The method of any of the examples 1-9, further comprising: enhancing the terrestrial source image data by performing densification to add image details using interpolation.

Example 10. The method of any of the examples 1-9, wherein the correlating points comprises applying a point co-registration scheme to correlate of the terrestrial source image data and the aerial based image data.

Example 11. A system comprising: one or more processors of a machine; and at least one memory storing instructions that, when executed by the one or more processors, cause the machine to perform any of the methods of examples 10.

Example 12. A machine-storage media embodying instructions that, when executed by a machine, cause the machine to perform any of the methods of examples 1-10.

Example 13. A method comprising: identifying a plurality of images from user devices, one or more of the plurality of images depicting a physical structure; identifying reference data that maps to the physical structure; generating an initial 3D model of the physical structure using a first set of images from of the plurality of images and the reference data, the reference data implemented to minimize errors between generated points in the initial 3D model and corresponding points in the reference data; generating an updated 3D model of the physical structure using a second set of images from the plurality of images and the reference data; and storing the updated 3D model of the physical structure.

Example 14. The method of example 13, wherein the reference data comprises point cloud data of points that correlate to other points that correspond to the physical structure.

Example 15. The method of any of examples 13-14, wherein the point cloud data is generated from an aerial vehicle.

Example mesh data that describe a shape of the physical structure.

Example 17. The method of any of examples 13-16, wherein generating the initial 3D model comprises applying a structure from motion scheme to a pair of images of the plurality of images.

Example 18. The method of any of examples 13-17, wherein generating the updated 3D model of the physical structure using the second set of images comprises registering the second set of images against the initial 3D model.

Example 19. The method of any of examples 13-18, wherein the generating the updated 3D model of the physical structure using the second set of images further comprises: optimizing image pose data while optimizing three dimensional point locations simultaneously.

Example 20. The method of any of examples 13-19, further comprising: transmitting the updated 3D model of the physical structure to one or more client devices, the client devices implementing the updated 3D model of the physical structure to generate augmented reality content items Example 21. The method of any of examples 13-20, further comprising: receiving, from the one or more client devices, ephemeral messages comprising the augmented reality content items.

Example 22. The method of any of examples 13-21, further comprising: publishing the ephemeral messages on a social network site.

Example 23. A system comprising: one or more processors of a machine; and at least one memory storing instructions that, when executed by the one or more processors, cause the machine to perform any of the methods of examples 13-22.

Example 24. A machine-storage media embodying instructions that, when executed by a machine, cause the machine to perform any of the methods of examples 13-22.

Figure 13:
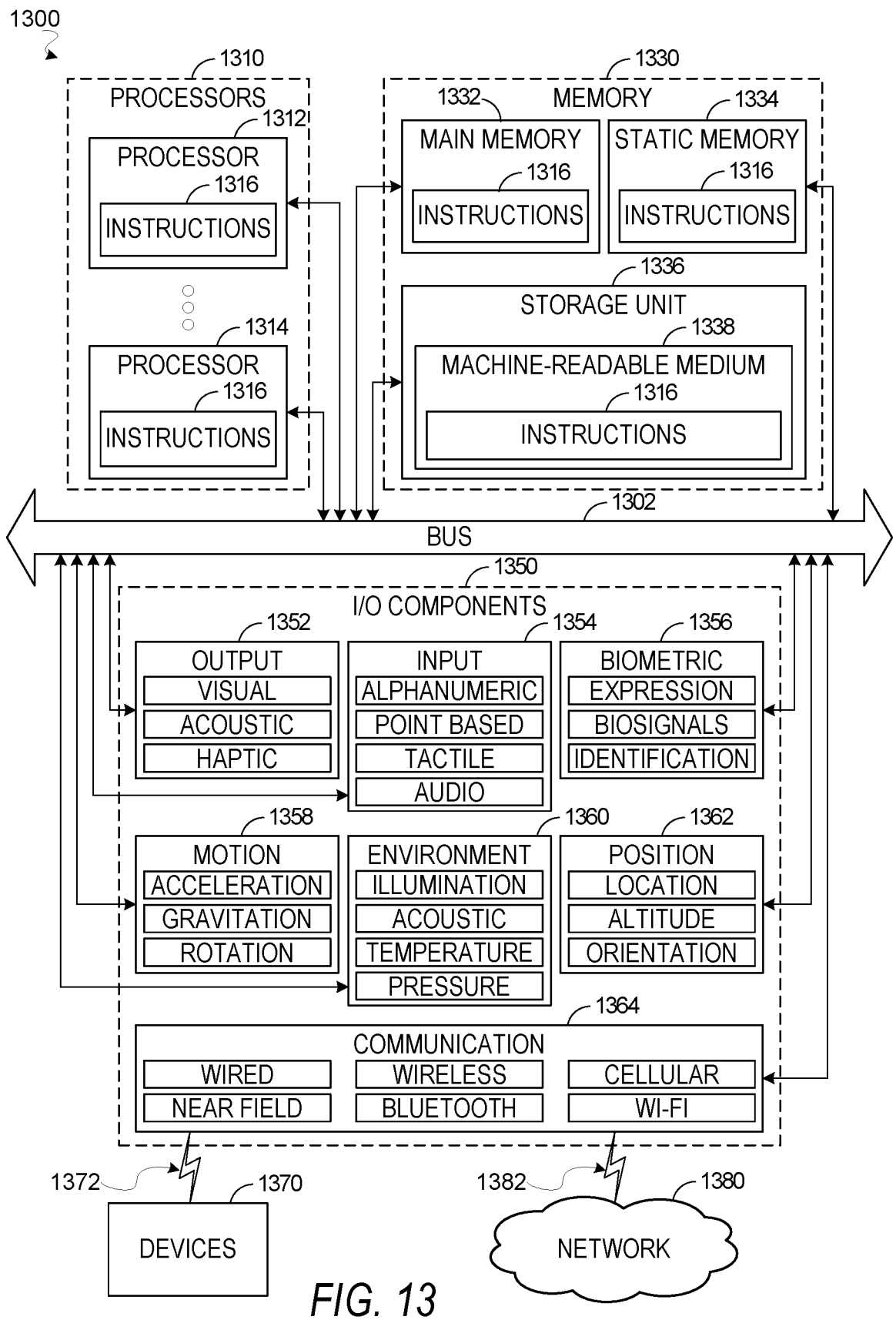
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1316 may be used to implement modules or components described herein. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310, memory/storage 1330, and input/output (I/O) components 1350, which may be configured to communicate with each other such as via a bus 1302. The memory/storage 1330 may include a main memory 1332, static memory 1334, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336 (e.g., on machine readable-medium 1338), within at least one of the processors 1310 (e.g., within the processor cache memory accessible to processors 1312 or 1314), or any suitable combination thereof, during execution thereof by the machine 1300. Accordingly, the memory 1332, the storage unit 1336, and the memory of the processors 1310 are examples of machine-readable media.

The I/O components 1350 may include a wide variety of components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environment components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environment components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or other suitable device to interface with the network 1380. In further examples, the communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1316 for execution by the machine 1300, and includes digital or analog communications signals or other intangible media to facilitate communication of such instructions 1316. Instructions 1316 may be transmitted or received over the network 1380 using a transmission medium via a network interface device and using any one of a number of well-known transfer protocols.

"CLIENT DEVICE" in this context refers to any machine 1300 that interfaces to a network 1380 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, STB, or any other communication device that a user may use to access a network 1380.

"COMMUNICATIONS NETWORK" in this context refers to one or more portions of a network 1380 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1380 may include a wireless or cellular network and the coupling 1382 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting, or a setting specified by the recipient. Regardless of the setting technique, the message 400 is transitory.

"MACHINE-READABLE MEDIUM" in this context refers to a component, a device, or other tangible media able to store instructions 1316 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions 1316 (e.g., code) for execution by a machine 1300, such that the instructions 1316, when executed by one or more processors 1310 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor 1312 or a group of processors 1310) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1300) uniquely tailored to perform the configured functions and are no longer general-purpose processors 1310.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1312 configured by software to become a special-purpose processor, the general-purpose processor 1312 may be configured as respectively different special-purpose processors (e.g., comprising different hardware components) at different times. Software accordingly configures a particular processor 1312 or processors 1310, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1310 that are temporarily configured (e.g., by software) or permanently configured to perform the relevant operations. Whether temporarily or permanently configured, such processors 1310 may constitute processor-implemented components that operate to perform one or more operations or functions described herein. As used herein, "processor-implemented component" refers to a hardware component implemented using one or more processors 1310. Similarly, the methods described herein may be at least partially processor-implemented, with a particular processor 1312 or processors 1310 being an example of hardware. For example, at least some of the operations of a method may be performed by one or more processors 1310 or processor-implemented components. Moreover, the one or more processors 1310 may also operate to support performance of the relevant operations in a "cloud computing" environment or as a "software as a service" (SaaS). For example, at least some of the operations may be performed by a group of computers (as examples of machines 1300 including processors 1310), with these operations being accessible via a network 1380 (e.g., the Internet) and via one or more appropriate interfaces (e.g., an API). The performance of certain of the operations may be distributed among the processors 1310, not only residing within a single machine 1300, but deployed across a number of machines 1300. In some example embodiments, the processors 1310 or processor-implemented components may be located in a single geographic location (e.g., within a home environment, an office environment, or a server farm). In other example embodiments, the processors 1310 or processor-implemented components may be distributed across a number of geographic locations.

"PROCESSOR" in this context refers to any circuit or virtual circuit (a physical circuit emulated by logic executing on an actual processor 1312) that manipulates data values according to control signals (e.g., "commands," "op codes," "machine code," etc.) and which produces corresponding output signals that are applied to operate a machine 1300. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1310 may further be a multi-core processor 1310 having two or more independent processors 1312, 1313 (sometimes referred to as "cores") that may execute instructions 1316 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   accessing a first set of images generated by a first computing device, the first set of images depicting a physical structure;
   identifying reference data that maps to the physical structure;
   generating an initial 3D model of the physical structure using the first set of images and the reference data, the reference data implemented to minimize errors between generated points in the initial 3D model and corresponding points in the reference data;
   providing the initial 3D model of the physical structure to a second computing device to generate an augmented reality content item with the physical structure;
   accessing a second set of images generated by the second computing device for the augmented reality content item;
   generating an updated 3D model of the physical structure using the second set of images and the reference data, the updated 3D model comprising first point cloud data based on the first set of images and second point cloud data based on the second set of images, the second point cloud data independent from the first point cloud data; and
   storing the updated 3D model of the physical structure.

2. The method of claim 1, wherein the reference data comprises reference point cloud data of points that correlate to other points that correspond to the physical structure.

3. The method of claim 2, wherein the reference point cloud data is generated from an aerial vehicle.

4. The method of claim 1, wherein the reference data is model mesh data that describe a shape of the physical structure.

5. The method of claim 1, wherein generating the initial 3D model comprises applying a structure from motion scheme to a pair of images of the first set of images.

6. The method of claim 1, wherein generating the updated 3D model of the physical structure comprises:
   registering the second set of images against the initial 3D model.

7. The method of claim 6, wherein generating the updated 3D model of the physical structure further comprises:
   optimizing image pose data while optimizing three dimensional point locations simultaneously.

8. The method of claim 1, further comprising:
   receiving a video post comprising the second set of images; and
   publishing the video post to a media site.

9. The method of claim 1, further comprising:
   receiving an ephemeral message comprising the augmented reality content item; and
   publishing the ephemeral message on a media site.

10. The method of claim 1, wherein generating the updated 3D model of the physical structure comprises:
    generating the second point cloud data using the second set of images as camera frustrums; and
    aligning the second point cloud data with the reference data.

11. A system comprising:
    one or more processors of a machine; and
    at least one memory storing instructions that, when executed by the one or more processors, cause the machine to perform operations comprising:
      accessing a first set of images generated by a first computing device, the first set of images depicting a physical structure;
      identifying reference data that maps to the physical structure;
      generating an initial 3D model of the physical structure using the first set of images and the reference data, the reference data implemented to minimize errors between generated points in the initial 3D model and corresponding points in the reference data;
      providing the initial 3D model of the physical structure to a second computing device to generate an augmented reality content item with the physical structure;
      accessing a second set of images generated by the second computing device for the augmented reality content item;
      generating an updated 3D model of the physical structure using the second set of images and the reference data, the updated 3D model comprising first point cloud data based on the first set of images and second point cloud data based on the second set of images, the second point cloud data independent from the first point cloud data; and storing the updated 3D model of the physical structure.

12. The system of claim 11, wherein the reference data comprises reference point cloud data of points that correlate to other points that correspond to the physical structure.

13. The system of claim 12, wherein the reference point cloud data is generated from an aerial vehicle.

14. The system of claim 11, wherein the reference data is model mesh data that describe a shape of the physical structure.

15. The system of claim 11, wherein generating the initial 3D model comprises applying a structure from motion scheme to a pair of images of the first set of images.

16. The system of claim 11, wherein generating the updated 3D model of the physical structure comprises:

registering the second set of images against the initial 3D model.

17. The system of claim 16, wherein generating the updated 3D model of the physical structure further comprises:

optimizing image pose data while optimizing three dimensional point locations simultaneously.

18. The system of claim 11, further comprising:

receiving a video post comprising the second set of images; and publishing the video post to a media site.

19. The system of claim 11, further comprising:

receiving an ephemeral message comprising the augmented reality content item; and publishing the ephemeral message on a media site.

20. A non-transitory machine-storage media embodying instructions that, when executed by a machine, cause the machine to perform operations comprising:

accessing a first set of images generated by a first computing device, the first set of images depicting a physical structure;

identifying reference data that maps to the physical structure;

generating an initial 3D model of the physical structure using the first set of images and the reference data, the reference data implemented to minimize errors between generated points in the initial 3D model and corresponding points in the reference data;

providing the initial 3D model of the physical structure to a second computing device to generate an augmented reality content item with the physical structure;

accessing a second set of images generated by the second computing device for the augmented reality content item;

generating an updated 3D model of the physical structure using the second set of images and the reference data, the updated 3D model comprising first point cloud data based on the first set of images and second point cloud data based on the second set of images, the second point cloud data independent from the first point cloud data; and storing the updated 3D model of the physical structure.

* * * * *